United States Patent
Martin et al.

(10) Patent No.: US 6,614,788 B1
(45) Date of Patent: Sep. 2, 2003

(54) NETWORK ADDRESS MANAGEMENT (75) Inventors: Jean-Christophe Martin, Varces (FR); Regis Marco, Meylan (FR)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/034,789

(22) Filed: Mar. 3, 1998

(51) Int. Cl.7 .................................. H04L 12/28
(52) U.S. Cl. ........................................ 370/392
(58) Field of Search ........................ 370/389, 395, 370/391, 392, 465, 466, 441, 341, 431, 443, 449, 451, 461, 462, 438, 439, 448, 401, 351, 352, 390, 396; 340/825.08; 709/226, 223, 224, 235, 240; 379/114.01

(56) References Cited

U.S. PATENT DOCUMENTS

| | | | | |
|---|---|---|---|---|
| 5,793,763 A | * | 8/1998 | Mayes et al. | 370/401 |
| 5,802,053 A | * | 9/1998 | Bollella et al. | 370/465 |
| 5,835,723 A | * | 11/1998 | Andrews et al. | 370/252 |
| 5,956,391 A | * | 9/1999 | Melen et al. | 379/114.01 |
| 5,999,525 A | * | 12/1999 | Krishnaswamy et al. | 370/352 |
| 6,091,737 A | * | 7/2000 | Hong et al. | 370/438 |
| 6,131,120 A | * | 10/2000 | Reid | 709/225 |
| 6,154,776 A | * | 11/2000 | Martin | 709/226 |
| 6,233,616 B1 | * | 5/2001 | Reid | 709/225 |
| 6,359,894 B1 | * | 3/2002 | Hong et al. | 370/389 |

OTHER PUBLICATIONS

R. Droms, "Dynamic Host Configuration Protocol", Oct. 1993, pp. 1–34.*

* cited by examiner

*Primary Examiner*—Dang Ton
(74) *Attorney, Agent, or Firm*—William J. Kubida; Kent A. Lembke; Hogan & Hartson LLP (57) ABSTRACT

Network address (e.g. IP address) allocation under first and second protocols (e.g. RADIUS and DHCP) is achieved using a directory service. A common network address pool is maintained under the control of a directory service. The directory service allocates network addresses in response to requests. The directory service also maintains a record of network address allocation to users, which can be achieved by storing a network address allocated to a user at the user's entry in the directory. Thus, for example, IP address allocation under RADIUS and DHCP can be unified using a common address pool and mappings between IP addresses and the user/hosts information in an ISO/CCITT X.500 based directory service using LDAP.

28 Claims, 6 Drawing Sheets

NETWORK ADDRESS MANAGEMENT

BACKGROUND OF THE INVENTION

This invention relates to network address management for a telecommunications network, for example for Internet protocol (IP) address management for the Internet.

It has now become commonplace for systems dynamically to request their Internet protocol address (IP address) from a pool of addresses managed either by a Network Access Server (NAS) using the Remote Authentication Dial-In User (RADIUS) protocol or by servers using the Dynamic Host Configuration Protocol (DHCP).

As indicated, dynamic IP allocation is today based on one of two protocols, namely the Remote Authentication Dial-In user Protocol (RADIUS) and the Dynamic Host Configuration Protocol (DHCP). Information about RADIUS can be found, for example, in C Rigney, A Rubens, W Simpson and S Willens "Remote Authentification Dial in User Service (RADIUS)" RFC 2138, April 1997. Information about DHCP can be found, for example in R. Droms "Dynamic Host Configuration Protocol", RFC-2131, March 1997.

These two protocols are managed independently, with a separate pool of IP addresses being kept for each protocol. Where a remote client requests, either explicitly or implicitly, an IP address under RADIUS from a network access server, the network access server allocates an IP address from a RADIUS pool. Where a client on a LAN connected to a network access server requests an IP address from the network access server under DHCP, it allocates an IP address from the DHCP pool.

This conventional arrangement works in principle but it can be inefficient in its management of the IP addresses. This inefficiency is particularly true in an organisation where users may operate both on the local network and at a remote location requiring external access. One difficulty is the proliferation of IP addresses which results. Another possible area of difficulty is the maintenance of common access rights for a user when using local and remote sessions with different IP addresses.

An aim of the present invention is therefore to mitigate the problems identified above.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with an aspect of the invention, there is provided a computer implemented method for network address allocation under first and second protocols, the method comprising the steps of:

maintaining a common network address pool as part of a directory service; and responding to messages under at least one of the first and second protocols to cause the directory service to record an allocated network address.

Thus, in accordance with this aspect of the invention, a directory service maintains a common pool of available IP addresses for the two protocols and maintains a record of address allocations which can then be used for allocation of further IP addresses under either of the protocols. The identification of the IP addresses allocated to users and/or host names can be centralised. The record can be achieved, for example, by storing a network address allocated to a user at an entry for that user in a directory of the network service. The directory service can then retrieve an available network address from the directory of the directory service.

The responding step can comprise responding to an allocation request to initiate allocation of a network address. The allocation request can be either explicit or implicit. Where one of the protocols is, for example, RADIUS, an allocation request from a client can cause a server to allocate a network address. Where the protocol is RADIUS and the allocation is done at a client, an accounting message can cause the RADIUS server to record the network address. In this case the network address will be returned to the client.

In a preferred embodiment of the invention, the initiating step comprises sending an LDAP message from a protocol front end to the directory service.

Thus, the invention addresses for the first time the coexistence of these two protocols, and the management of common IP address pools. An embodiment of the invention bases the address pool management on an ISO/CCITT X.5500 based directory service.

In particular, a preferred embodiment of the invention unifies the two protocols by using the same address pools and keeps maps between the IP addresses and the user/hosts information in the same ISO/CCITT X.500 based directory service using the Lightweight Directory Access Protocol (LDAP). Messaging can also be implemented using LDAP messages. The network address can be an IP address in an Internet implementation. The first and second protocols can be selected from DHCP and RADIUS, for example.

In accordance with a preferred aspect of the invention, there is provided a computer implemented method for IP address allocation under RADIUS and DHCP, the method comprising steps of:

a) receiving a request from a client for an IP address through at least one of RADIUS and DHCP;

b) sending the request to a directory service for an unused IP address;

c) returning a response to the client including an unused IP address allocated to the client; and d) updating the directory service for the allocated IP address—hostname/user binding.

This method can include a subsequent step of:

e) de-allocating the IP address using accounting information on user logoff for RADIUS, or the lease time expiration for DHCP.

It is assumed in the above that the network address allocation is performed by the server. However, client based allocation is also possible in some environments. Thus, an embodiment of the invention can include listening to accounting messages to keep track of client based network address allocation.

An embodiment of the invention thus provides for the automatic updating of a directory to take account of changing network address allocations. In an embodiment of the invention, therefore, communication between a protocol front end (e.g., for RADIUS and/or DHCP) and a directory server includes the writing of information from the front ends to the directory. To date, the communication between a protocol front end and a directory server has been limited to read-only for authentification purposes. An embodiment of the invention thus enables writing to a directory server to record in the directory the allocation of, for example, network access addresses.

Indeed, in accordance with another aspect of the invention, there is provided computer implemented method for maintaining network access information in a directory of a directory service comprising steps at the directory service of:

maintaining the directory; and responding to write instructions from an access protocol server to change the network access information in the directory.

This method can also include the step of the access protocol server listening to accounting messages from a client and issuing such a write instruction to update the directory in response to network address allocation information in an accounting message.

The network access information can comprise a network address (e.g., an IP address), for example, or also other information such as, for example, a calling ID (telephone number) of, for example, a client.

In accordance with a further aspect of the invention, there is provided a network address allocation mechanism for network address allocation under first and second protocols, the mechanism comprising a directory service controller configured to be operable to maintain a common network address pool and a protocol front end configured to be operable to respond to at least one of the first and second protocols to initiate recording of a network address allocation.

In an embodiment of the invention, the protocol front end is further configured to be operable to respond to an allocation request.

The invention also provides a computer program product on a carrier medium, the computer program product forming a mechanism for network address allocation under first and second protocols, the mechanism being configured to be operable to define a common network address pool and to record a network address allocation in response to messages under at least one of the first and second protocols.

Moreover, the invention provides a directory server operable to provide network address allocation under first and second protocols, the network access server comprising a directory service controller operable to:

maintain a common network address pool in a directory of the directory service; and to respond to a message from a protocol front end for at least one of the first and second protocols to record a network address allocation in the directory.

The invention further provides a network address allocation mechanism configured to be responsive to a network address allocation request from a client to issue a request to a network access server under a directory access protocol to cause the network access server to return a network address for return to the client.

Moreover, the invention also provides a protocol server configured to be responsive to information from a client to cause updating of information in a directory of a directory service. For example, for protocol server-based protocol network address allocation, the protocol server can be responsive to a predetermined message or messages from the client under a directory access protocol to cause the network access server to return a network address for the client.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
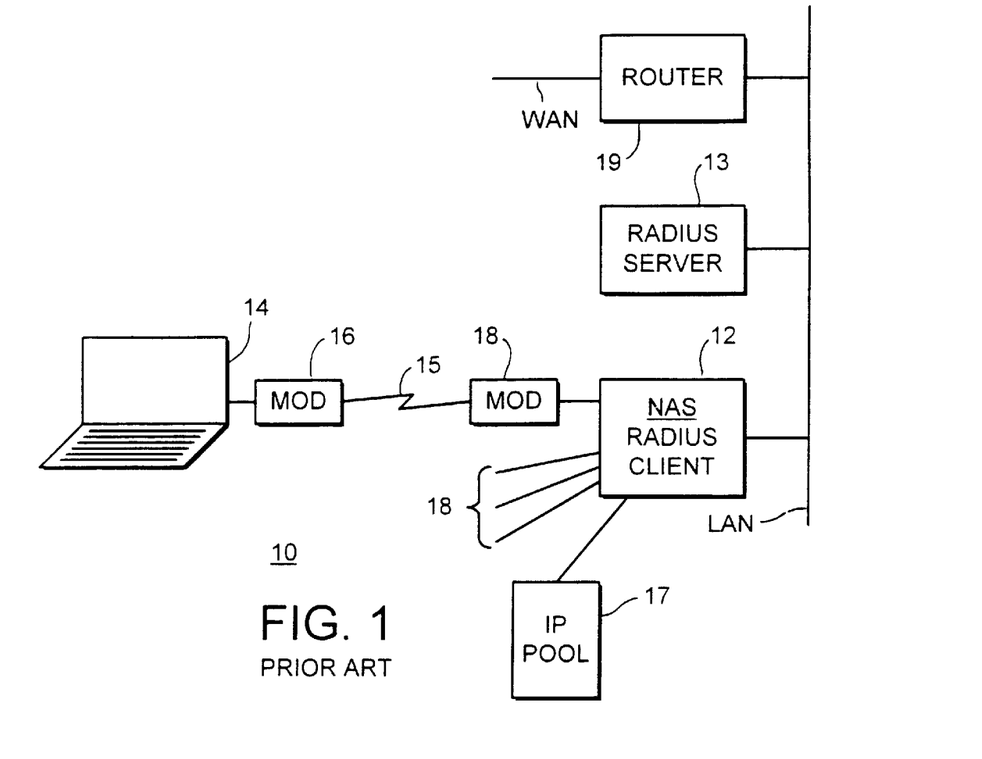
FIG. 1 is a schematic representation of a RADIUS environment.

FIG. 1 is a schematic representation of a mechanism for allocating IP addresses in a RADIUS environment. In FIG. 1, a remote workstation 14 makes access to a RADIUS client 12 via first and second modems 16 and 18 and a telecommunications connection 15. The RADIUS client 12 is typically implemented as a network access server (NAS). A RADIUS server 13 is connected to the RADIUS client 12 via LAN. A router 19 connects the LAN to a WAN. On establishment of a connection, the RADIUS client will carry out user authentication, using for example a point to point protocol (PPP). The RADIUS client will configure the access of users via the modems by interrogating the RADIUS server. Typically this will involve interrogating the server for passwords for authenticating the user(s). The RADIUS client can also allocate an IP address to the user from a pool of available IP addresses 17. Alternatively, the RADIUS server could allocate the IP address. The user will typically retain the IP address allocated until the user logs off.

Figure 2:
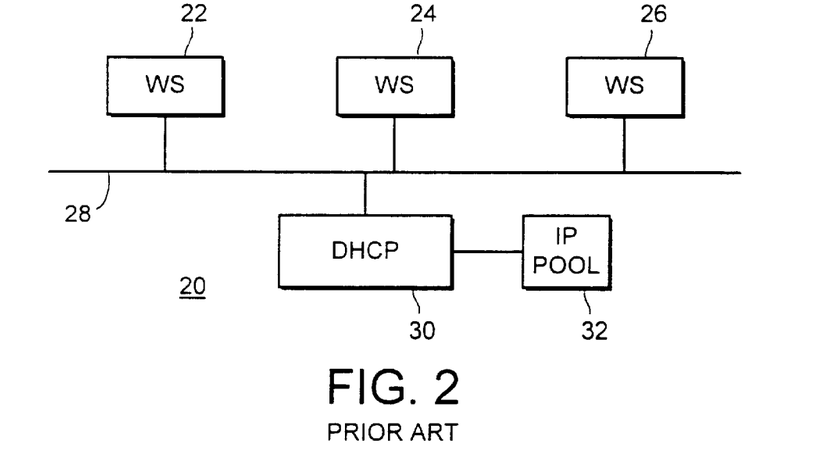
FIG. 2 is a schematic representation of a DHCP environment.

FIG. 2 is a schematic representation of a DHCP environment having a LAN 28 with a number of workstations 22, 24 and 26 and a DHCP server 30 connected thereto. The DHCP server allocates IP addresses to the workstations. Typically, when a workstation is initialised, it requests an IP address from the DHCP server 30. The DHCP server then allocates an available IP address from an IP address pool 32. IP addresses are typically returned to the IP pool after a lease time expires.

These two systems work well in isolation. However, the operation of the two protocols can be seen to be inefficient when the two protocols are operated side by side.

Figure 3:
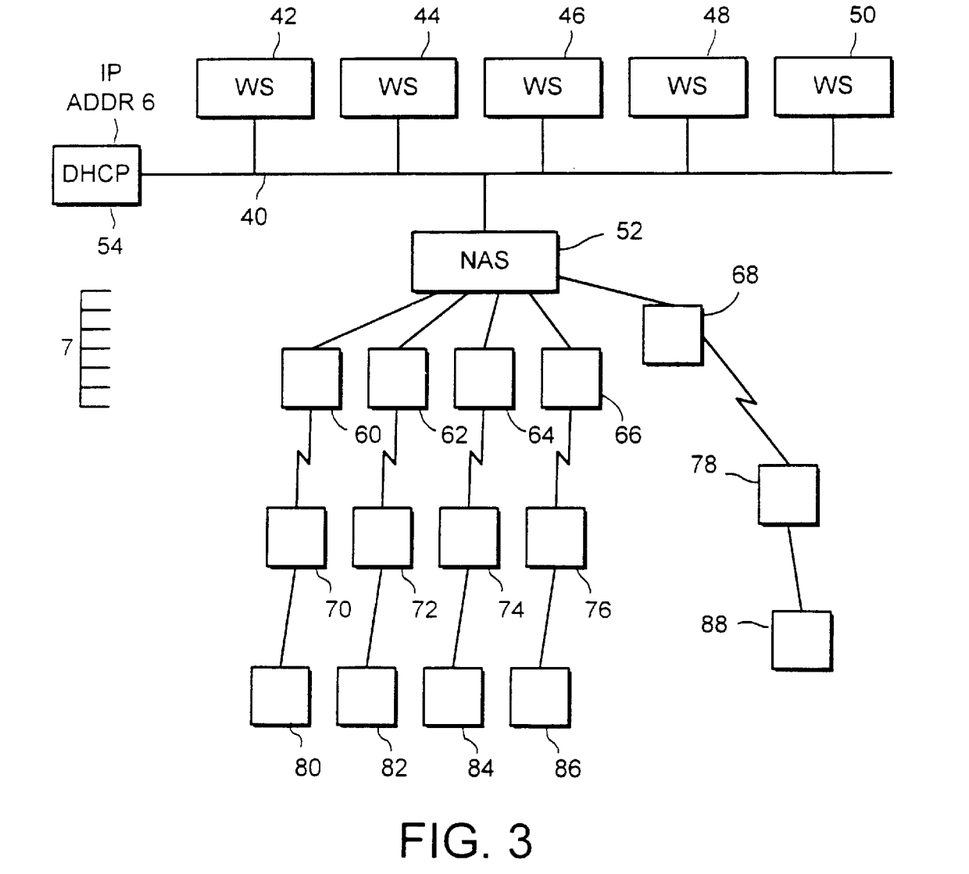
FIG. 3 is a schematic representation of a combined DHCP and RADIUS environment.

FIG. 3 is a schematic representation of an environment for a small concern having five workstations 42–50 in house connected by a LAN 40 under the control of a DHCP server 54 and connected by means of a network access server 52 and five modems 60–68 to corresponding modems 70–78 and to corresponding remote workstations 80–88 at the user's homes. In order to provide the five workstations 42–50, the DHCP server 54, the network access server 52 and the five remote workstations 80–88 would require a total of 12 IP addresses, although in practice it is likely that at most five of the workstations would be active at any one time (assuming a user is either using his/her workstation in the office, or his/her workstation at home, but not both at any one time).

Figure 4:
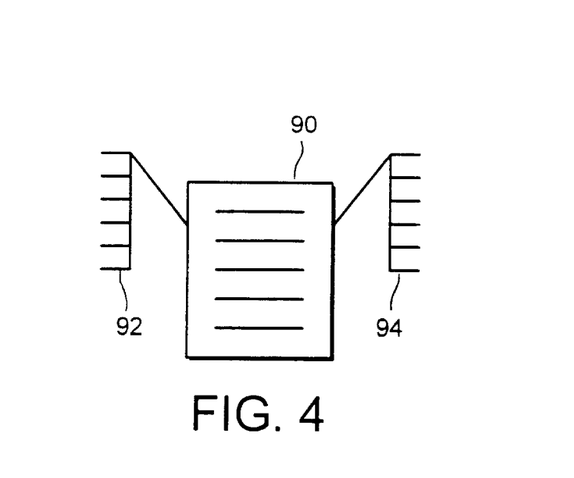
FIG. 4 is a schematic representation of a common address pool.

In accordance with an embodiment of the invention, therefore, as schematically represented in FIG. 4, it is proposed to have a common pool of IP addresses 90 and to allow access to the common pool from both DHCP 92 and RADIUS 94. In the example shown in FIG. 3, and assuming the constraint on system operation mentioned above (i.e. that a user will not simultaneously use his/her machines in the office and at home) a pool of seven IP addresses will suffice (i.e. one IP address per user, one for the common pool (i.e. the RADIUS/DHCP/directory server combination) and one for the network access server).

The preferred embodiment is implemented by use of the Lightweight Directory Access Protocol (LDAP).

Figure 5:
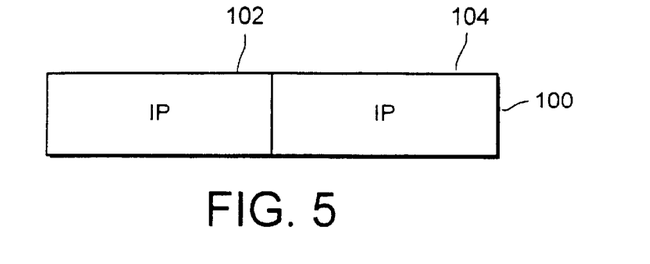
FIG. 5 is a schematic representation of an LDAP message.

FIG. 5 contains schematic representation of an LDAP message format (LDAP message) 100 which provides an envelope containing common fields required in all protocol exchanges. The LDAP message provides a sequence with a message identifier (message ID) 102 followed by a protocol operator (protocol OP) 104. The message ID has a unique value compared to that of all other outstanding requests in an LDAP session. The message ID is echoed in all responses corresponding to a request in which the message ID was initially used.

The protocol operation specified by an LDAP message can conventionally be selected from the following types:

| | |
|---|---|
| bindRequest - | initiates a protocol session between a client and a server and sets out the parameters for the session; |
| bindResponse - | returns an indication of the status of the client's request for initiation of a session; |
| unbindRequest - | terminates a session and has no response defined; |
| searchRequest - | enables a client to initiate a search and defines: the base object in the directory with respect to which the search is to be performed; the scope of the search to be performed; an indication of how aliases are to be handled; a maximum search result size to be returned; a time limit for the search; indication of which attributes are to be returned and whether attribute types and/or values are to be returned; and a filter defining match characteristics; |
| searchResponse - | returns the response to a search request, wherein a sequence of responses will typically be necessary in order to return the full response to the request from the client; |
| modifyRequest - | enables a client to request modification of an object in the directory; |
| modifyResponse - | returns the result of the modification request; |
| addRequest - | enables a client to request addition of an object to the directory; |
| addResponse - | returns the result of the addition request; |
| delRequest - | enables a client to request deletion of an object to the directory; |
| delResponse - | returns the result of the deletion request; |
| modifyRDNRequest - | enables a client to request modification of the last component (Relative Distinguished Name) of the name of an entry in the directory; |
| modifyRDNResponse - | returns the result of the RDN modification request; |
| compareDNRequest - | enables a client to compare an attribute value with an entry in the directory; |
| compareDNResponse - | returns the result of the comparison request; |
| abandonRequest - | enables abandonment of a request. |

Figure 6:
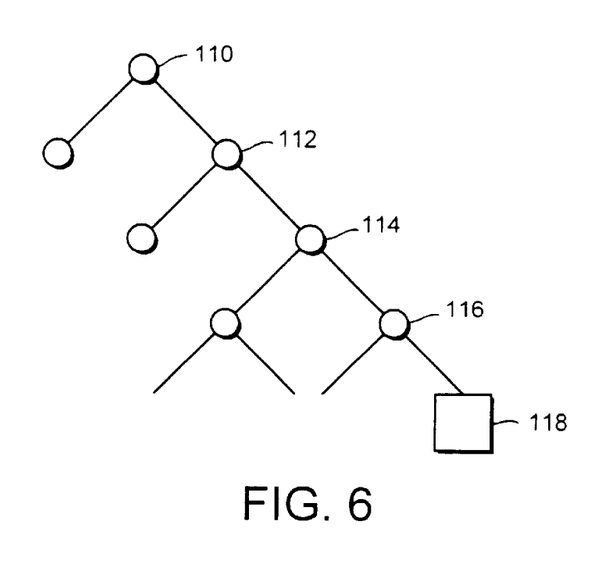
FIG. 6 is a schematic representation of an LDAP object-based protocol.

LDAP, as well as defining a messaging environment, also defines a hierarchical object-based directory structure for users and resources as represented in FIG. 6, where a user is defined at an entry 118 at the end of a hierarchy of nodes, say nodes 110, 112, 114, 116. An embodiment of the invention makes use of the LDAP structure to modify a user entry 118 in the object hierarchy.

In particular, an IP address is stored in the user's LDAP object entry. It is therefore possible to access the LDAP hierarchy to establish whether or not the user has been allocated an IP address and if so to determine what that is.

Thus, a preferred embodiment of the invention unifies the DHCP and RADIUS protocols using a common address pool and keeps the maps between the IP addresses and the user/hosts in an ISO/CCITT X.500 based directory service using the Lightweight Directory Access Protocol (LDAP).

Figure 7:
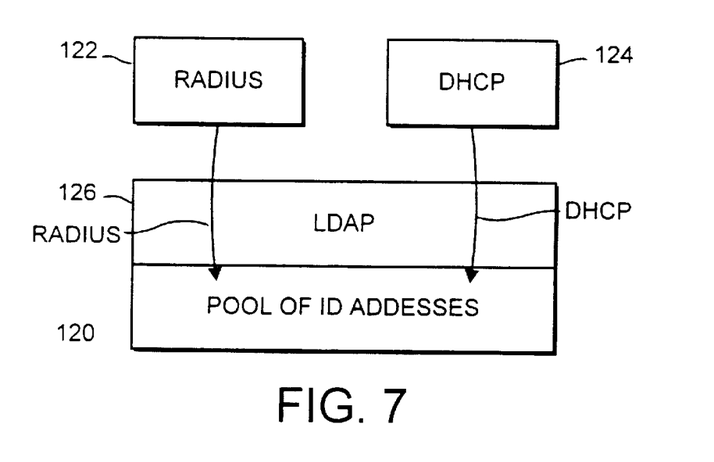
FIG. 7 illustrates address allocation using a common address poll according to an embodiment of the invention.

FIG. 7 is a schematic representation of a possible relationship between the common pool of IP addresses 120 and RADIUS 122 and DHCP 124 IP address allocation mechanisms accessing the common address pool 120 via LDAP 126.

Figure 8:
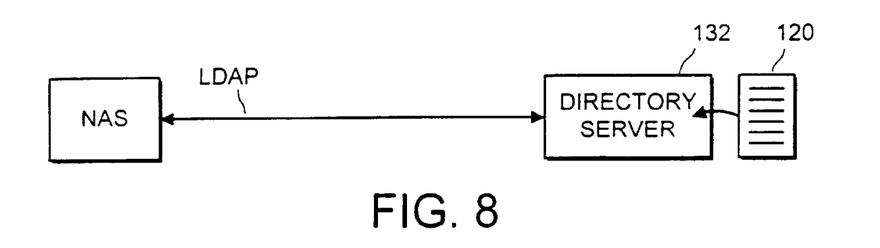
FIG. 8 illustrates a direct connection of an network access server to a directory server with a common address pool.
Figure 9A:
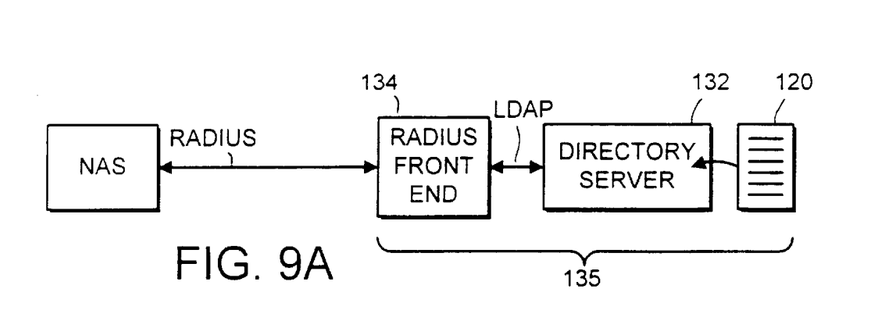
FIGS. 9A and 9B illustrates a connection to a directory service via a RADIUS front end and a DHCP front end respectively.
Figure 9B:
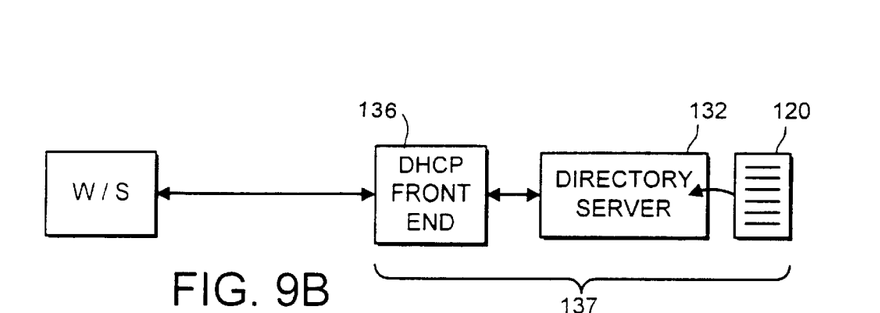

FIGS. 8, 9A and 9B illustrate various arrangements for connections to a directory server or directory service.

FIG. 8 shows a possible arrangement for connecting users via a network access server 130 directly to a directory server 132 via LDAP, enabling IP address allocation from the common pool of IP addresses 120. The directory server 132 holds the LDAP directory represented in FIG. 6, the common address pool 120 and a directory control mechanism for accessing and modifying the directory and for accessing the IP addresses.

FIG. 9A shows another arrangement where the connection is made via a RADIUS front end 134. The combination of the RADIUS front end 134 and the directory server 132 forms a RADIUS server 135. This arrangement facilitates the user name identification of the user(s) when on the LAN 40. This is because the RADIUS server knows a user's name due to the user authentication procedure referenced above.

FIG. 9B shows similar arrangement to FIG. 9A, but where the connection is made via a DHCP front end 136. The combination of the RADIUS front end 136 and the directory server 132 forms a DHCP server 137.

Figure 10A:
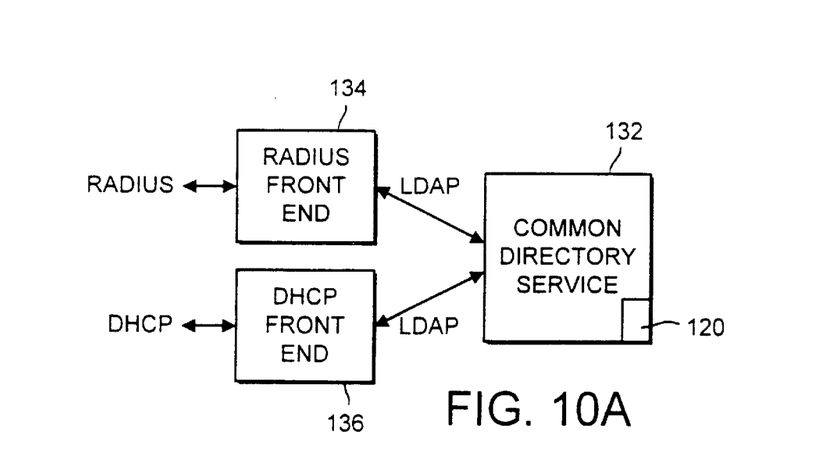
FIGS. 10A, 10B and 10C are schematic block diagrams of alternative implementations for combined RADIUS and DHCP servers.
Figure 10B:
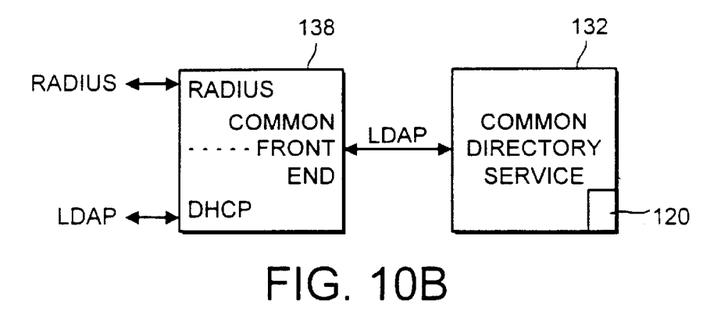
Figure 10C:
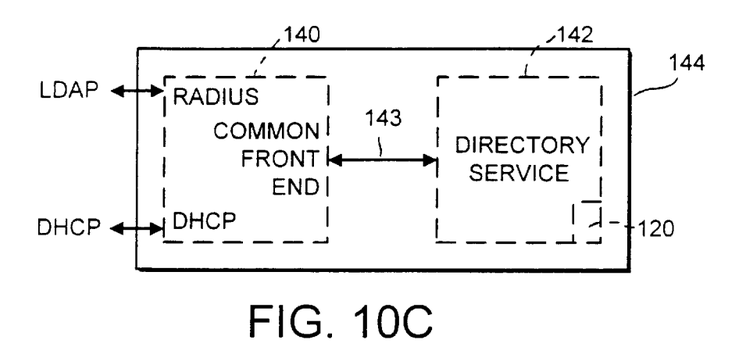

A combination of the arrangements of FIGS. 9A and 9B can be implemented in various ways as shown in FIG. 10.

In FIG. 10A, separate RADIUS and DCHP front ends 134 and 136 on respective network protocol servers are connected to a common directory access server 132.

In FIG. 10B, a common RADIUS/DCHP front end 138 provided on a combined network protocol server is connected to a common directory access server 132.

In FIG. 10C, RADIUS and DCHP front ends 140 (which may be integrated as one module or provided as separate modules) and a directory service 142 are combined in a directory server 144, with internal data exchange 143 between the front end(s) 138 and the directory service 142. The internal data exchange can be, but need not be, under LDAP.

Figure 11:
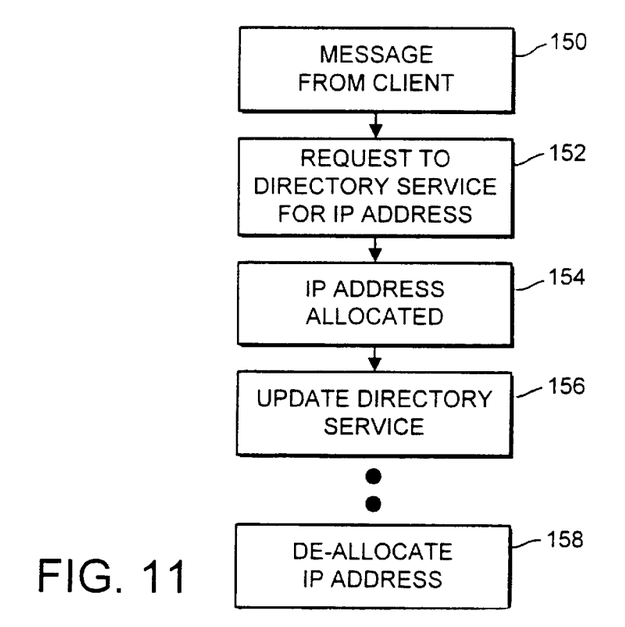
FIG. 11 is a flow diagram illustrating stages in address allocation according to an embodiment of the invention.

FIG. 11 is a flow diagram representing the stages in the allocation and release of an IP address in an embodiment of the invention, which will be described with reference to FIG. 10B. In this example it is assumed that address allocation is performed by the server, as opposed to the client.

In step 150, a message or other event is received at the combined front end under DHCP or RADIUS, which message or event is interpreted by the combined front end as requiring allocation of an IP address. This message could, for example, be an allocation request under RADIUS.

In step 152, an LDAP request message is sent from the combined front end 138 to the directory service 132 for an unused IP address.

In step 154, an LDAP response including the IP address is returned from the directory service 132 to the combined front end 138, from where it is transmitted to the client (e.g. as an accounting message or as an allocation acknowledgement as appropriate).

In step 156, the directory service 132 updates the directory 120 with the new IP address—hostname/user binding, whereby the directory service is able to maintain a record of the current network address allocation status. This step could be performed simultaneously with, or before or after step 154.

At a subsequent time, in step 158, the IP address is de-allocated in response, for example, to an accounting message on user logoff under RADIUS, or the lease time expiration under DHCP.

As mentioned above, FIG. 11 illustrates network address allocation by the server. However, network address allocation could be performed by the client in some instances. In this case, therefore, steps 152 and 154 are effectively performed by the client. In an embodiment of the invention arranged to provide for such an environment, the directory service still maintains a record of the current network address allocation status. Accordingly, on network address allocation by the client, an accounting message is interpreted by the combined front end 138 as an instruction to send an LDAP message to the directory service to update the directory with the new network address allocation information.

Figure 12A:
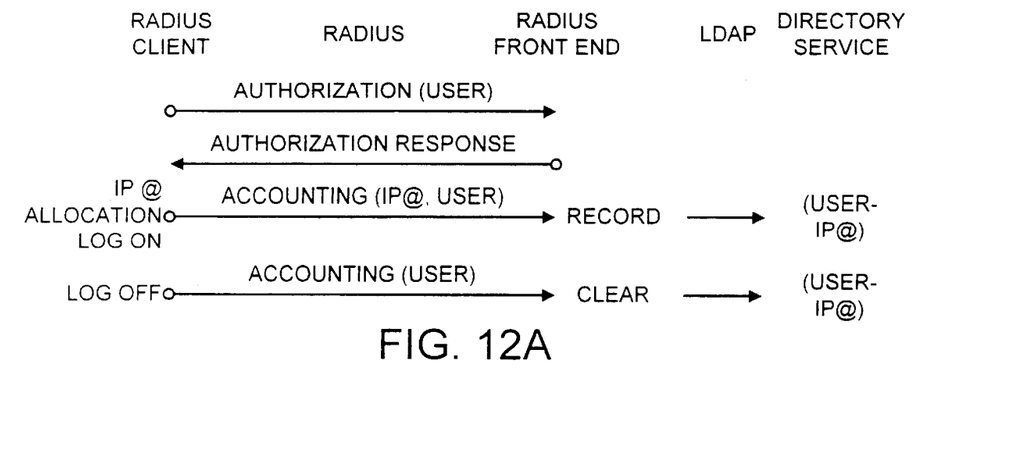
FIGS. 12A and 12B are schematic information flow diagrams.

FIG. 12A is a schematic representation of the message exchange where a RADIUS client allocates an IP address.

Initially, the RADIUS client sends an allocation request (authorization request) to the RADIUS front end (RADIUS server) identifying the user. The RADIUS front end then returns an authorization response. Subsequently, on log on, the RADIUS client allocates an IP address to a user and sends an accounting message (LOGON message) identifying the user and the allocated IP address. The RADIUS front end then sends an LDAP message to the directory service to create or update an IP address—user allocation record in the directory. Subsequently, on log off, the RADIUS client sends a further accounting message to the RADIUS front end (LOGOFF message) identifying the user. The RADIUS front end then sends an LDAP message to the directory service to clear the IP address—user allocation record for that user.

Figure 12B:
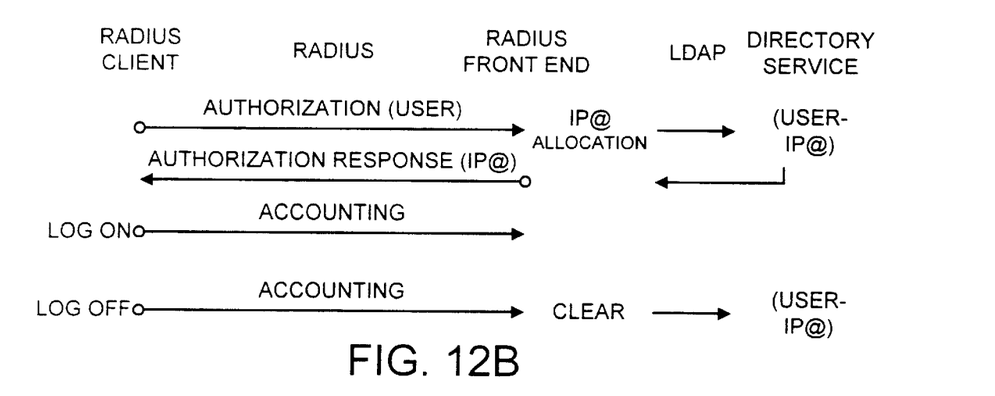

FIG. 12B is a schematic representation of the message exchange where a RADIUS server allocates an IP address (compare FIG. 11).

Initially, the RADIUS client sends an authorization request for the user to the RADIUS front end (RADIUS server). The RADIUS front end then sends an LDAP message to the directory service requesting IP address allocation. The directory service identifies an unused internet address, returns this as an LDAP message to the RADIUS front end and creates or updates an IP address—user allocation record in the directory. The RADIUS front end then returns an authorization response identifying the IP address to the RADIUS client. Subsequently, on log on, the RADIUS client sends an accounting message (LOGON message) to the RADIUS front end. Subsequently, on log off, the RADIUS client sends a further accounting message to the RADIUS front end (LOGOFF message) identifying the user. The RADIUS front end then sends an LDAP message to the directory service to clear the IP address—user allocation record for that user.

DHCP address allocation occurs in a similar manner, except that there are no accounting messages and allocation is only possible in the server.

Accordingly, an embodiment of the invention provides a common address pool for the DHCP and RADIUS mechanisms, with the mapping between the allocated IP address and the hostname/user kept in an easy to access, single location, that is the directory of the directory service. The request and response messaging between the network access server and the directory service can be effected using conventional LDAP messages as illustrated above.

The directory controller mechanism can be implemented as a software mechanism operable on conventional computing hardware, including a memory, processor, etc, in the directory server. Thus, the network address allocation mechanism can be implemented by code stored in an execution memory and executed on a processor in the directory server, with the computer network directory being stored in memory. The directory server memory can thus form a carrier medium for the directory and the network address allocation mechanism, and the component parts thereof. It can be stored in the directory server memory as a carrier medium. They can also be supplied as a computer program product on a disc, over a network communication line or any other carrier medium. Alternatively, they can be implemented at least in part by special purpose hardware, for example one or more ASICs.

Similarly, the network access server functions can be implemented as a software mechanism operable on conventional computing hardware, including a memory, processor, etc, in the network access server itself. Thus, the software mechanism can be stored in memory at a network client station as a carrier medium. They can also be supplied as a computer program product on a disc, over a network communication line or any other carrier medium. Alternatively, they can be implemented at least in part by special purpose hardware, for example one or more ASICs.

Although particular embodiments of the invention have been described based on the LDAP protocol in the context of an Internet application, it will be appreciated that the invention is not limited thereto, and that the invention finds application to any communications network application where it is desired to combine network address pools for different protocols.

For example, in the preferred embodiments reference is made to maintaining the network addresses (IP addresses) in the directory. Thus, in these embodiments of the invention automatic updating of a directory takes account of changing network address allocation. Communication between a protocol front end (e.g., for RADIUS and/or DHCP) and a directory server includes the writing of information from the front ends to the directory. This communication possibility means that the invention is not limited to the recording of network address allocation. Indeed, an embodiment of the invention thus enables writing to a directory server to record in the directory network access information, including a network address (e.g., an IP address) and other information such as, for example, a calling ID (telephone number) of, for example, a client. Thus an embodiment of the invention can be responsive generally to information from a client to cause updating of information in a directory of a directory service.

Thus, although particular embodiments of the invention have been described, many modifications/additions and/or substitutions may be made within the spirit and scope of the present invention as defined in the appended claims. With reference to those claims, it is to be noted that combinations of features of the dependent claims other than those explicitly enumerated in the claims may be made with features of other dependent claims and/or independent claims, as appropriate, within the spirit and scope of the present invention.

What is claimed is:

1. A computer implemented method for network address allocation under first and second protocols, said method comprising the steps of:
   maintaining a common network address pool of available network addresses for said first and said second protocols as part of a directory service;
   communicatively linking said directory service to a first protocol-based mechanism and to a second protocol-based mechanism; and
   responding to messages from one of said first and second protocol-based mechanisms under at least one of said first and said second protocols to cause said directory service to record an allocated network address from said available network addresses in said common network pool.

2. The method of claim 1, wherein said responding step comprises:
   responding to an allocation request from a client to initiate allocation of an instance of said network address.

3. The method of claim 2, wherein said initiating step comprises sending an LDAP message from a protocol front end to said directory service.

4. The method of claim 2, further comprising:
   returning said allocated network address to said client.

5. The method of claim 1 further comprising the step of:
   said directory service retrieving an available said network address from a directory of said directory service.

6. The method of claim 5, further comprising the step of:
   said directory service storing said network address allocated to a user at an entry in said directory.

7. The method of claim 1, wherein said directory service is an ISO/CCITT X.500 based directory service under the Lightweight Directory Access Protocol (LDAP).

8. The method of claim 1, wherein said network address is an IP address.

9. The method of claim 1, wherein said first and second protocols are DHCP and RADIUS, interchangeably.

10. A computer implemented method for IP address allocation under RADIUS and DHCP, said method comprising steps of:
    a) receiving a request from a client for an IP address through at least one of said RADIUS and said DHCP;
    b) sending said request to a single directory service for an unused IP address;
    c) returning a response to said client including said unused IP address allocated to said client; and
    d) updating the directory service for the allocated IP address—hostname/client binding.

11. The method of claim 10, comprising a subsequent step of
    e) de-allocating said IP address using accounting information on user logoff for RADIUS.

12. The method of claim 10, comprising a subsequent step of
    e) de-allocating said IP address using lease time expiration for DHCP.

13. A directory server operable to provide network address allocation under first and second protocols, said directory server comprising a directory service controller operable:
    to maintain a common network address pool in a directory of said directory service controller; and
    to respond to a message from a protocol front end for at least one of said first and second protocols to record a network address allocation in said directory.

14. A directory server according to claim 13, wherein said directory service controller is further operable to respond to a request for allocation of a network address to allocate and to return said network address.

15. A network address allocation mechanism for network address allocation under first and second protocols, said mechanism comprising a directory service controller configured to be operable to maintain a common network address pool of available network addresses for said first and said second protocols and a protocol front end configured to be operable to respond to at least one of said first and said second protocols to initiate recording of said network address allocation.

16. The mechanism of claim 15, wherein said protocol front end is further configured to be operable to respond to an allocation request from a client to initiate allocation of said network address.

17. The mechanism of claim 16, wherein said protocol front end is further configured to be operable to send an LDAP message to said directory service.

18. The mechanism of claim 16, wherein said protocol front end is further configured to be operable to return an allocated network address to said client.

19. The mechanism of claim 15, wherein said directory service is further configured to retrieve an available said network address from a directory of said directory service.

20. The mechanism of claim 19, wherein said directory service comprises an object based directory and is further configured to be operable to store said network address allocated to a user at an entry for said user in said directory.

21. The mechanism of claim 15, wherein said directory service is an ISO/CCITT X.500 based directory service under the Lightweight Directory Access Protocol (LDAP).

22. The mechanism of claim 15, wherein said network address is an IP address.

23. The mechanism of claim 15, wherein said first and second protocols are DHCP and RADIUS, interchangeably.

24. A network address allocation mechanism for network address allocation under first and second protocols, said mechanism comprising means for maintaining a common network address pool and means for recording a network address allocation in response to messages under at least one of said first and said second protocols.

25. A mechanism according to claim 24, further comprising means for allocating a network address to a user.

26. A computer program product on a carrier medium, said computer program product forming a mechanism for network address allocation under first and second protocols, said mechanism being configured to be operable to define a common network address pool and to record a network address allocation in response to messages under at least one of said first and said second protocols.

27. The computer program product on a carrier medium according to claim 26, wherein said mechanism is further operable to respond to a request for allocation of a network address under at least one of said first and said second protocols to allocate and return said network address.

28. A computer-implemented method for network address allocation, comprising:
    maintaining a common network address pool of available network addresses for allocation under DHCP and RADIUS protocols;
    communicatively linking the common network address pool to a DHCP-based mechanism and to a RADIUS-based mechanism; and
    responding to a message from one of the mechanisms under at least one of the DHCP or RADIUS protocols by recording an allocated network address from the pool of available network addresses and returning a response to a device sending the messages including the allocated network address.

* * * * *